United States Patent [19]

Sterzel et al.

[11] 4,248,996

[45] Feb. 3, 1981

[54] PREPARATION OF LINEAR HIGH MOLECULAR WEIGHT SATURATED POLYESTERS

[75] Inventors: Hans-Josef Sterzel, Dannstadt-Schauernheim; Franz Schmidt, Mannheim; Hans Pirzer, Frankenthal, all of Fed. Rep. of Germany

[73] Assignee: BASF Aktiengesellschaft, Ludwigshafen, Fed. Rep. of Germany

[21] Appl. No.: 15,785

[22] Filed: Feb. 28, 1979

[30] Foreign Application Priority Data

Mar. 25, 1978 [DE] Fed. Rep. of Germany ....... 2813161

[51] Int. Cl.³ ............................................. C08G 63/22
[52] U.S. Cl. .................................. 528/272; 528/309; 528/495; 528/496; 528/501
[58] Field of Search ............... 528/272, 309, 495, 496, 528/501

[56] References Cited

U.S. PATENT DOCUMENTS 4,138,544   2/1979   Janssen et al. ...................... 528/272

*Primary Examiner*—Lucille M. Phynes
*Attorney, Agent, or Firm*—Keil & Witherspoon

[57] ABSTRACT

A process for the preparation of high molecular weight linear saturated polyesters derived from dicarboxylic acids or their ester-forming derivatives and aliphatic and/or cycloaliphatic diols, comprising the condensation of polyester precondensates having a relative viscosity of from 1.05 to 1.15 at from 220° to 280° C. under reduced pressure, wherein (a) the condensation is first started with from 70 to 95 percent by weight of the polyester precondensate and
(b) after from 10 to 50% of the total condensation time the remaining 5 to 30 percent by weight of the polyester precondensate are added to the polyester melt undergoing condensation in accordance with (a), and the condensation is taken to completion.

6 Claims, No Drawings

PREPARATION OF LINEAR HIGH MOLECULAR WEIGHT SATURATED POLYESTERS

In the preparation of high molecular weight linear saturated polyesters, low molecular weight precondensates having a low viscosity are converted into high molecular weight condensates at from 260° to 300° C. under reduced pressure, with elimination of diols. However, at the high temperatures required polyester melts are unstable, and this results in an increased carboxyl end group content of the products. In the process disclosed in German Published Application DE-AS No. 1,745,541, the polyester precondensate is passed through a horizontal zone divided into sub-zones, the melt being shaped into a thin film in each sub-zone. The process has the disadvantage that it requires a substantial amount of time, for example several hours, and hence has an adverse effect on the heat stability of the polyester obtained. This is particularly true if one of the diol components is butane-1,4-diol, since the additional formation of tetrahydrofuran favors the formation of carboxyl and groups.

It is an object of the invention to modify the polycondensation of polyester precondensates so that it takes place more rapidly than the corresponding (conventional) technological method of condensation and that a polyester of increased heat stability is obtained.

We have found that this object is achieved in a process for the preparation of high molecular weight linear saturated polyesters derived from dicarboxylic acids or their ester-forming derivatives and aliphatic and/or cycloaliphatic diols, comprising condensation of polyester precondensates having a relative viscosity of from 1.05 to 1.15 at from 220° to 280° C. under reduced pressure, wherein (a) the condensation is first started with from 70 to 95% by weight of the polyester precondensate and (b) after from 10 to 50% of the total condensation time remaining 5 to 30% by weight of the polyester precondensate are added to the polyester melt undergoing condensation in accordance with (a), and the condensation is taken to completion.

The novel process has the advantage that it takes place more rapidly than the corresponding (conventional) technological process. In addition, the novel process has the advantage that it gives polyester melts which have increased heat stability. The novel process has the further advantage that existing processes can be rendered more effective by a simple modification.

The results achieved in accordance with the invention are surprising inasmuch as it had to be assumed that as far as the proportion of precondensate added later is concerned, the shortened condensation time to which it was subjected would no longer suffice to give high molecular weight polyesters.

The high molecular weight linear saturated polyesters, like the polyester precondensates, are derived from dicarboxylic acids or their ester-forming derivatives, for example their alkyl esters. Aliphatic and/or aromatic dicarboxylic acids having a molecular weight of less than 390 are preferred. Particularly preferred dicarboxylic acids have a hydrocarbon structure apart from the carboxyl groups. Alkanedicarboxylic acids of 5 to 10 carbon atoms, and benzenedicarboxylic or naphthalenedicarboxylic acids, especially those derived from benzene, have acquired particular industrial importance. Terephthalic acid deserves particular mention. Examples of suitable starting materials are glutaric acid, succinic acid, naphthalene-2,6-dicarboxylic acid, 4,4'-diphenyldicarboxylic acid, 4,4'-diphenoxydicarboxylic acid, terephthalic acid, isophthalic acid and $C_1$–$C_4$-alkyl esters, especially methyl esters, of the above acids.

Preferred diols are aliphatic and/or cycloaliphatic diols of molecular weight less than 280. Preferably, they have a hydrocarbon structure apart from the hydroxyl groups. Alkanediols, especially those of 2 to 6 carbon atoms, have acquired particular industrial importance. Examples of suitable diols are ethylene glycol, propylene glycol, butane-1,4-diol, hexane-1,6-diol and 1,4-bishydroxymethylcyclohexane. Ethylene glycol and butane-1,4-diol have acquired particular industrial importance.

Industrially particularly preferred polyesters, and their precondensates, essentially consist of polyethylene terephthalate units and polybutylene terephthalate units. The process has proved particularly suitable for the preparation of polyesters which contain at least 50 mole %, preferably from 70 to 100 mole percent, of polybutylene terephthalate units.

The polyester precondensates are obtained in the conventional manner, for example by reacting a dicarboxylic acid or an ester thereof with a diol in the presence of a catalyst, for example a titanate ester, or an antimony, manganese or zinc compound, for example a fatty acid salt thereof, at from 150° to 260° C. The resulting di-glycol ester of the carboxylic acid is then precondensed under reduced pressure, eg. from 5 to 50 mm Hg, at from 220° to 270° C. Such precondensates have a relative viscosity of from 1.05 to 1.15 (measured on an 0.5 percent strength by weight solution in a mixture of phenol and ortho-dichlorobenzene in the weight ratio of 3:2 at 25° C.). The preparation of such precondensates is described, for example, in German Laid-Open Application DE-OS No. 2,514,116.

The condensation of the polyester precondensates to give high molecular weight polyesters is carried out at from 220° to 280° C. under reduced pressure, advantageously under from 0.1 to 2 mm Hg. The temperature employed also depends on the melting point of the polyester to be produced, ie. it should be at least 10° C. above this melting point. Of course the diol eliminated during the condensation is continuously removed from the reaction mixture.

According to the invention, the procedure followed is that (a) the condensation is first started with from 70 to 95% by weight, especially from 75 to 90% by weight, of the polyester precondensate, under the above conditions, and (b) after from 10 to 50%, especially from 20 to 35%, of the total condensation time the remaining 5 to 30% by weight of the polyester precondensate are added to the polyester melt undergoing condensation in accordance with (a). Advantageously, the polyester melt undergoing condensation according to (a) has a relative viscosity of from 1.25 to 1.53 at the time of addition of the remaining proportion of polyester precondensate. Of course this remainder, added in accordance with (b), is intimately mixed with the polyester melt undergoing condensation.

The process according to the invention can easily be carried out batchwise by first condensing the stated major proportion until the stated conditions are reached and, after from 10 to 50% of the total condensation time, adding the remaining proportion, with thorough mixing, and completing the condensation of the mixture. The process can readily also be carried out continuously in suitable equipment. In this case, the major proportion is first condensed continuously under the stated conditions and the remaining 5 to 30% by weight of the polyester precondensate are added at the appropriate point of the condensation zone, for example in the second quarter of a horizontal condensation zone, the added amount being intimately mixed with the polyester melt undergoing condensation, after which the mixture obtained is completely condensed, in the condensation time which remains, to give a high molecular weight polyester.

Polyesters obtainable by the process of the invention may be used for the manufacture of shaped articles, eg. filaments, films, injection moldings and extruded articles, and also for the production of coatings.

The Examples which follow illustrate the process according to the invention.

EXAMPLES

1. Preparation of a polybutylene terephthalate precondensate

Dimethyl terephthalate and butane-1,4-diol in the molar ratio of 1:1.5 are trans-esterified, in the presence of 0.15% of tetrabutyl orthotitanate, based on the amount of dimethyl terephthalate, in a stirred kettle of 500 liters capacity equipped with a stirrer, nitrogen inlet and fractionating column, at from 130° to 220° C., with elimination of methanol.

The temperature is then raised to 250° C. in the course of 50 minutes whilst continuously lowering the pressure to about 10 mm Hg; butane-1,4-diol distils off under these conditions.

A polybutylene terephthalate precondensate having a relative viscosity of 1.13 is obtained.

The precondensate is forced into a condensation kettle, heated to 250° C., which has a capacity of 500 liters and is equipped with a stirrer specially designed for very viscous melts.

The condensation to give the high molecular weight polyester is carried under the process conditions described in the Table below, at 250° C. under a pressure of 0.5 mm Hg.

At the times shown, the stated amounts of precondensate, originating from an earlier batch, are added to the melt undergoing condensation.

The Table shows that the polybutylene terephthalate prepared by the process according to the invention has a higher viscosity after a shorter total condensation time.

In addition, the product obtained has greater heat stability since the relative viscosity of the polyester decreases less in the course of one hour, while the condensation kettle is being discharged, than does the Comparative Batch 1 prepared according to the prior art.

| Batch | 1 Comparative Example | 2 | 3 | 4 |
|---|---|---|---|---|
| Weight of precondensate at the start of the condensation | 200 kg (100%) | 180 kg (90%) | 170 kg (85%) | 160 kg (80%) |
| Condensation time, minutes | — | 40 min | 30 min | 36 min |
| % of total condensation time | — | 39% | 28% | 32% |
| kg of precondensate added | — | 20 kg | 30 kg | 40 kg |
| % of total batch | — | 10% | 15% | 20% |
| Total condensation time, minutes | 120 min | 103 min | 107 min | 110 min |
| Relative viscosity at the end of the condensation | 1.67 | 1.77 | 1.82 | 1.74 |
| Relative viscosity after a discharge time of 1 hour | 1.59 | 1.72 | 1.75 | 1.705 |

A continuous procedure modified according to the invention also gives improved results compared to an unmodified procedure.

We claim:

1. A process for the preparation of high molecular weight linear saturated polyesters derived from dicarboxylic acids or their ester-forming derivatives and aliphatic and/or cycloaliphatic diols, comprising the condensation of polyester precondensates having a relative vicosity of from 1.05 to 1.15 at from 220° to 280° C. under reduced pressure, wherein
    (a) the condensation is first started with from 70 to 90 percent by weight of the polyester precondensate and
    (b) after from 10 to 50% of the total condensation time the remaining 5 to 30 percent by weight of the polyester precondensate are added to the polyester melt undergoing condensation in accordance with (a), and the condensation is taken to completion.

2. The process of claim 1, wherein the polyester melt undergoing condensation has a relative viscosity of from 1.25 to 1.53 at the time of addition of the remaining proportion of polyester precondensate.

3. The process of claim 1, wherein the remaining proportion of polyester precondensate is added after from 20 to 35% of the total condensation time.

4. The process of claim 1, wherein the condensation is started with from 75 to 90 percent by weight of the polyester precondensate.

5. The process of claim 1, wherein a polyester precondensate which contains at least 50 mole percent of polybutylene terephthalate units is used.

6. The process of claim 1, wherein a polyester precondensate which contains from 70 to 100 mole percent of polybutylene terephthalate units is used as the starting material.

* * * * *